(12) United States Patent
Nuovo (10) Patent No.: US 7,454,014 B2
(45) Date of Patent: Nov. 18, 2008

(54) DEVICE WITH A LOUDSPEAKER AND AN EAR PIECE COVER (75) Inventor: Frank Nuovo, Los Angeles, CA (US)

(73) Assignee: Vertu Limited, London (GB)

( * ) Notice: Subject to any disclaimer, the term of this patent is extended or adjusted under 35 U.S.C. 154(b) by 485 days.

(21) Appl. No.: 10/465,953

(22) PCT Filed: Nov. 28, 2001

(86) PCT No.: PCT/US01/44439

§ 371 (c)(1),
(2), (4) Date: Jan. 9, 2004

(87) PCT Pub. No.: WO02/054509

PCT Pub. Date: Jul. 11, 2002

(65) Prior Publication Data

US 2004/0114754 A1 Jun. 17, 2004

(30) Foreign Application Priority Data

Dec. 29, 2000 (GB) ................................. 0031788.3

(51) Int. Cl.
H04M 1/00 (2006.01)
H04M 9/00 (2006.01)
(52) U.S. Cl. .............. 379/434; 379/433.01; 379/433.04
(58) Field of Classification Search ............ 379/433.02, 379/420.01, 440, 433.12, 433.04, 434; 455/575.1, 455/550.1, 569.1, 90.2, 90.3
See application file for complete search history.

(56) References Cited

U.S. PATENT DOCUMENTS

| 4,969,180 | A |   | 11/1990 | Watterson et al. | |
|---|---|---|---|---|---|
| 5,136,639 | A |   | 8/1992 | Brito | |
| 5,745,566 | A |   | 4/1998 | Petrella et al. | |
| 5,872,831 | A |   | 2/1999 | Zoiss et al. | |
| 5,960,078 | A |   | 9/1999 | Eckhardt | |
| 6,011,699 | A | * | 1/2000 | Murray et al. | 361/814 |
| D429,490 | S | * | 8/2000 | Collins et al. | D14/248 |
| 6,135,582 | A |   | 10/2000 | Schuelke et al. | |
| 6,151,486 | A | * | 11/2000 | Holshouser et al. | 455/575.3 |
| 6,370,362 | B1 | * | 4/2002 | Hansen et al. | 455/90.1 |
| D460,445 | S | * | 7/2002 | Nguyen et al. | D14/250 |
| 6,594,472 | B1 | * | 7/2003 | Curtis et al. | 455/575.8 |
| 6,633,749 | B2 | * | 10/2003 | Kubo et al. | 455/90.3 |
| 6,643,529 | B1 | * | 11/2003 | Inoue et al. | 455/575.4 |
| 6,681,125 | B1 | * | 1/2004 | Woo | 455/556.1 |
| 6,728,519 | B1 | * | 4/2004 | Okuda | 455/90.3 |

(Continued)

FOREIGN PATENT DOCUMENTS

DE      29916458 U1   2/2000

(Continued)

OTHER PUBLICATIONS

Siemens M35i/M35 User Guide, XP-002194458, 74 pgs. Date: Jun. 2000.

Primary Examiner—Curtis Kuntz
Assistant Examiner—Phylesha L Dabney
(74) Attorney, Agent, or Firm—Harrington & Smith, PC (57) ABSTRACT The invention relates to casings (2) for portable communication devices (1). The casing (2) is reusable with engines having different processing capabilities.

13 Claims, 5 Drawing Sheets

U.S. PATENT DOCUMENTS

| | | | |
|---|---|---|---|
| 6,847,806 B2 * | 1/2005 | Curtis et al. | 455/90.3 |
| 7,027,844 B2 * | 4/2006 | Nuovo | 455/575.1 |
| 7,031,761 B2 * | 4/2006 | Hunt et al. | 455/575.2 |
| 7,069,063 B2 * | 6/2006 | Halkosaari et al. | 455/575.8 |
| 2002/0183017 A1 * | 12/2002 | Mujica | 455/90 |
| 2004/0021630 A1 * | 2/2004 | Lai et al. | 345/102 |
| 2006/0079305 A1 * | 4/2006 | Gartrell et al. | 455/575.8 |

FOREIGN PATENT DOCUMENTS

| | | | |
|---|---|---|---|
| EP | 0665655 | A2 | 8/1995 |
| EP | 0805562 | A2 | 11/1997 |
| GB | 2309848 | A | 8/1997 |
| GB | 2362774 | A | 5/2000 |
| GB | 2345818 | A | 7/2000 |
| GB | 2346759 | A | 8/2000 |
| GB | 2358744 | A | 8/2001 |
| GB | 2360905 | A | 10/2001 |
| WO | WO-97/32424 | A1 | 9/1997 |
| WO | WO-98/20622 | A1 | 5/1998 |
| WO | WO-00/08825 | A1 | 2/2000 |
| WO | WO-00/64127 | A1 | 10/2000 |

* cited by examiner

DEVICE WITH A LOUDSPEAKER AND AN EAR PIECE COVER

FIELD OF THE INVENTION

The invention relates devices such as portable communication devices and in particular to the earpiece region for such devices.

BACKGROUND OF THE INVENTION

Items of technical equipment are generally bought for their functionality. They are quickly superseded and replaced when a faster, cheaper to operate, smaller, or higher specification alternative is released onto the market, the previous model being discarded. The value of the product to its user is in what it can achieve, and perhaps to an extent the image that attaches to the owner of such an item. As fashion is constantly changing so is the image promoted by owning an individual item particularly in a fast moving technical area. What may have been the height of fashion can swiftly become out moded.

In fast moving technical areas changes are prompted by, amongst other things, the requirement to make the product smaller, cheaper, cheaper to use, have greater functionality, make use of emerging technologies or move with the latest tastes in design.

Generally when a radically new technical product is brought onto the market, for an initial period the product is elite and expensive. Consequently only limited numbers are produced. In the early years, because of the inherent rarity and the cost of components, there is a propensity to repair as much as possible. Despite the economic requirement for repair, as soon as a better product is launched, the previous item is soon obsolete and abandoned. The drive for innovation is the challenge of technical advancement and reduction of costs. This pattern has been followed with many items including the first colour televisions, and the first mobile phones.

In other products such as personal computers upgrading is a possibility, but these upgrades are possible only within carefully predefined limits. The casings being retained as a matter of convenience, it being the retention of the maximum amount of the existing technological hardware that drives the changes.

SUMMARY OF THE INVENTION

In accordance with a first aspect of the present invention there is provided a device including a casing, a loudspeaker, a user interface including at least one user input member, and an element that is designed to overlie the loudspeaker of the device, the element having apertures for allowing the egress of an audio signal from the loudspeaker, said apertures being designed for placing against a user's ear, wherein the element is formed of ceramic.

Ceramic is a suitable material because it is strong, durable and is resistant o scratching. Ceramic also provides a comfortable surface to a user's ear.

In accordance with a further aspect of the present invention there is provided a device including a casing, a loudspeaker, a user interface including at least one user input member, and an element that is designed to overlie the loudspeaker of the device, the element having apertures for allowing the egress of an audio signal from the loudspeaker, said apertures being designed for placing against a user's ear, wherein the element is fixed directly to the loudspeaker or to a mount of the loudspeaker.

In accordance with a further aspect of the present invention there is provided a device including a casing, a loudspeaker, a user interface including at least one user input member, and an element that is designed to overlie the loudspeaker of the device, the element having apertures for allowing the egress of an audio signal from the loudspeaker, said apertures being designed for placing against a user's ear, wherein the device has a face that includes both the element and the user interface and the element protrudes out of the face to a greater extent than the user interface protrudes out of the face.

In accordance with a further aspect of the present invention there is provided a device including a casing, a loudspeaker, a user interface including at least one user input member, and an element that is designed to overlie the loudspeaker of the device, the element having apertures for allowing the egress of an audio signal from the loudspeaker, said apertures being designed for placing against a user's ear, wherein the element overlays a portion of a display region of the device.

In accordance with a further aspect of the present invention there is provided a device including a casing, a loudspeaker, a user interface including at least one user input member, and an element that is designed to overlie the loudspeaker of the device, the element having apertures for allowing the egress of an audio signal from the loudspeaker, said apertures being designed for placing against a user's ear, wherein at least part of the casing is made from a precious material and the element is made from a material that is inherently warmer to the touch than the precious material.

In accordance with a further aspect of the present invention there is provided a casing for a portable communications device, the casing including an element that is designed to overlie the loudspeaker of the device, the element having apertures for allowing the egress of an audio signal from a loudspeaker of the device, said apertures being designed for placing against a user's ear, wherein the element is formed of ceramic The element may be fixed to a casing member that is designed to overlie the loudspeaker of the device, said casing member having apertures corresponding to the apertures in the element. The casing may have a face that includes both the element and the user interface and the element protrudes out of the face to a greater extent than the user interface protrudes out of the face.

The casing may additionally or alternatively have any of the following features: a face that includes both the element and the user interface, the element protruding out of the face to a greater extent than the user interface protrudes out of the face; the element overlying a portion of a display region of the device; the element being formed of a material that is inherently warmer to the touch than the casing; at least part of the casing being made from a precious material and the element being made from a material that is inherently warmer to the touch than the precious material; the element being formed of a material that is scratch-resistant; the element being fixed directly to the loudspeaker or to a mount of the loudspeaker; the element being fixed to a casing element that is designed to overlie the loudspeaker of the device.

The element may be formed of ceramic, leather, wood glass or metal. Preferably a material is chosen that provides a comfortable feel against a user's ear. The device may have a face that includes both the element and the user interface with the element protruding out of the face to a greater extent than the user interface protrudes out of the face. This allows the earpiece element to provide some protection to the user interface.

The element may overlay a portion of a display region of the device. The part of the element overlying the portion of the display may be V-shaped, so providing two edges along which icons may be displayed on the display. Examples of icons are an icon indicating the power remaining in a battery associated with the device, the strength of a signal received by a device, the proportion of memory associated with the device that is free/used etc.

Preferably the element is formed of a material that is scratch-resistant.

The element may be fixed to a casing element that is designed to overlie the loudspeaker of the device. Alternatively the element may be fixed directly to the loudspeaker or to a mount of the loudspeaker, for instance by adhesive.

The device may be any device that incorporates an ear piece and is particularly suitable for use on a portable communications device such as a telephone.

The casing may be a conventional one part casing or a clam shell, or other two or more part arrangement, where the user input elements or keys may be located on a different face to a display. In such two part arrangements generally respective casing portions are fixed such that one is movable relative to the other. The movement may be rotational or lateral.

When a casing is to be reusable it can be made from more valuable materials as these will not be redundant and cast aside when the next best technology comes along. A vast range of materials become available for customisation of elements of the device in fact there are virtually no bounds. Embodiments of the invention may use precious and semi precious materials including gem stones, other jewels and minerals, metals including those ranging from gold, silver, and platinum through to alloys such as steel. Materials such as ceramics in their various forms are also available for use in embodiments of the invention, the brittle nature of these materials, being able to be accommodated by the design of some embodiments. In addition, materials not generally considered in the context of technological devices, such as skins, leather being a particular example and wood and similar materials can also be utilised in embodiments of the invention.

BRIEF DESCRIPTION OF THE DRAWINGS

Embodiments of the invention will now be described in more detail with reference to FIGS. 1 to 5 of the accompanying drawings of which.

Embodiments of the invention will be described in greater detail below with exemplary materials being given for some specific or individual elements of the device. Where a material or veneer is discussed in relation to an element, the particular character of the element described is one of many or several that may be provided as options to a party commissioning a personalised device in accordance with the invention. In addition the exact material or surface decoration of the element could be individually commissioned.

DETAILED DESCRIPTION

Figure 1:
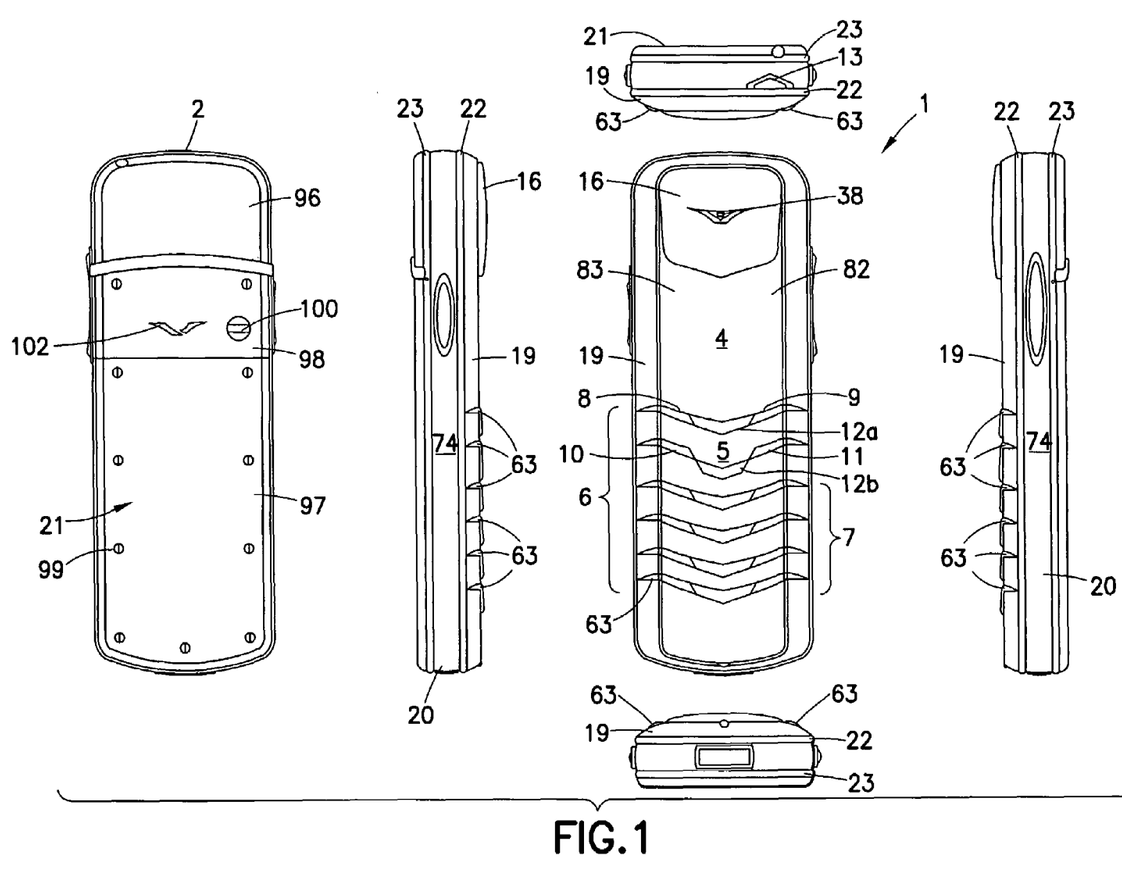
FIG. 1 shows front, rear, sides and top views of a communication device according to the invention.

The embodiment illustrated in FIG. 1 is a communication device 1 with a precious retainable casing 2. The casing 2 of the device may be customisable to individual taste with precious materials. To enable individual devices to be created, the number of external parts that the casing is formed from may be relatively large in contrast to existing communication devices.

The casing 2 has an optically permeable front face 3 providing a seamless transition from a display region 4 to an input region 5 that includes a key array 6. The key array 6 includes a first group of alphanumeric keys 7, for entering telephone numbers, writing text messages (SMS), writing names (associated with phone numbers), etc. Each of the twelve alphanumeric keys 7 is provided with a figure "0-9" or a sign "#" or "*", respectively. In an alpha mode each key is associated with a number of letters and special signs used in text editing. The key array 6 additionally comprises two soft keys 8, 9, two call handling keys 10, 11, two scroll keys 12, and an on/off key 13.

The functionality of the soft keys 8, 9 may depend on the state of the communication device and position within the menu accessed using the scroll keys 12. The current functionality of the soft keys 8, 9 can be shown in separate fields in the display region 4 just above the respective keys 8, 9.

The two call handling keys 10, 11 are used for establishing a call or a conference call, terminating a call or rejecting an incoming call.

The two direction keys or scroll keys 12, in the handset illustrated, are placed centrally on the front surface of the communication device between the display region 4 and the group of alphanumeric keys 7 to perform a scrolling function.

The seamless face 3 is formed from an optically seamless light guide providing light to illuminate the display region 4 and key legends 15 associated with individual keys of the key array 6.

The front face 3 is overlaid with a pillow 16 providing apertures 17 to channel sound from a loud speaker 18 and providing an appropriate feel for an element of the device that will be located close to the user's ear. The pillow 16 is an element that may also be referred to as an earpiece element or cover. The front face 3 is surrounded by a bezel 19 that can be made from a precious metal. This acts to protect the edges of the light guide 3 and can help in some embodiments in securing the elements of the casing 2 together.

The keys of the key array in this particular embodiment are arranged to provide particular sensory guidance to the user. Aspects of the design also allow the face 3 to be made from a wide range of materials including those that are brittle and so need to be carefully handled and protected from shattering.

The casing 2 is formed from the front face 3 surrounded by the bezel 19, a side frame 20 and a back cover 21. The interface between the side frame 20 and the bezel 19 and the side frame 20 and the rear cover 21 are shielded by rails 22, 23 in this embodiment. The rails 22, 23 hide raw edges from view and exposure to ensure that the device 1 is both long lasting and elegant. The construction of the casing 2 enables the casing 2 to be opened with ease to update the engine 24 inside when desired. The casing 2 is also designed to allow the device to accommodate different sized and shaped engines 24, which may be necessary through its life.

Other elements of the design will be discussed in greater detail with reference to the later drawings. By way of introduction, the device will be briefly discussed with reference to its functional elements.

Figure 3:
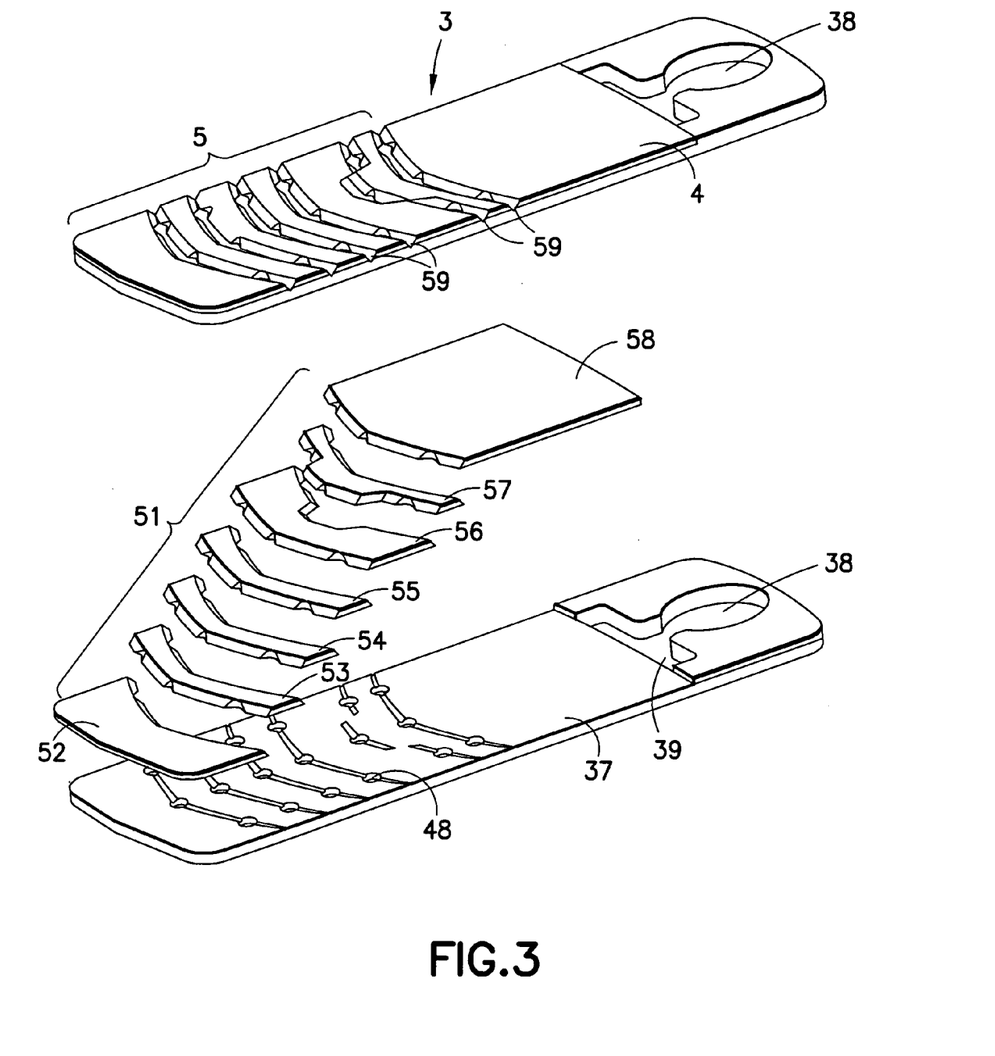
FIG. 3 is an exploded view of the face of a communication device of one embodiment of the invention without keys.

The communication device 1 includes the key array 6, a display 25, an antenna 26, an ear piece speaker 18, a polyphonic speaker 27, and a microphone 28. The communication device 1 is adapted for communication via a wireless telecommunication network, e.g. a wireless network. However, the communication device could also have been designed for a cordless network. FIG. 3 shows schematically and functionally elements of the communication device 1. The microphone 28 records the user's speech, and the analogue signals formed thereby are A/D converted by an A/D converter before the speech is encoded in an audio part 29. The encoded speech signal is transferred to processor 30. The processor 30 may support software in the phone. The processor 30 also forms the interface to peripheral units of the apparatus. These may include a Random Access Memory (RAM) 31 and a Flash Read Only Memory (ROM) 32, a SIM card 33, the display 25, and the key array 6, and perhaps a browser application 34, and a location module 35.

The browser application 34 can be used to request and receive information from the Internet. The location module 35 enables the terminal 1 to determine its current position.

The processor 30 communicates with a transceiver 36, e.g. a circuit, which is adapted to send and receive messages in a telecommunication network. The telecommunications network may be a GSM or W-CDMA network, but the invention may also be applied in connection with any other network, including but not limited to other kinds of wireless networks and various forms of cordless phone systems or in dual band phones accessing sets of these systems or networks. The audio part 29 decodes the speech signal, which is then transferred from the processor 30 to the earpiece 18 via a D/A converter.

The display 25 may form a permanent part of the casing or, to increase the potential for upgrading the engine throughout the life of the casing, it may be a module that can be replaced, for example, to account for the inevitable improvements in graphics that may occur.

As discussed above, the front face 3 is optically permeable and acts as a light guide. The seamless light guide, passing light over the display region 4 as well as providing light to illuminate the key legends 15 reduces the number of lighting elements required to illuminate the device and provides a seamless transition from one area of the front of the device to another. By using this technique for delivering light and also allowing the light guide 3 to form the front surface of the device 1 as in the embodiment disclosed, the device is visually striking, there being no visible transition from the display region 4 to the input region 5 where the key array 6 is located.

The embodiment illustrated in FIG. 1 has a light permeable front face 3 that can be formed from sapphire or a similar precious stone. As soon as a mineral such as sapphire is used in place of other more flexible light permeable materials such as plastics, additional problems are introduced associated with the character of the material. In designing a durable device having, for example, a brittle material for a front piece 3 there are many difficulties. In one manifestation of the embodiment illustrated in FIGS. 1 and 3 to 5, the front face 3 is an optically seamless composite layer. As can be seen most clearly in FIG. 3, a plastics layer 37 that may be formed from Perspex™ or other transparent and/or translucent materials runs the entire length of the front face 3. There is a cut-out 38 for accommodating the ear piece speaker 18 that is optimised for use close to the ear. There is another cut-out accommodating a light pipe diffuser 39. This is located under the pillow 16 and extends across the width of the device 1. By placing the light pipe 39 under the pillow 16, a bright area on the front face is avoided and the light visible in the light guide will be diffused. LEDs 40, 41 are located at each side of the device at each end of the pipe 39. Light from the LEDs 40, 41 is channelled through the pipe 39 and diffused. The light pipe 39 is coated with reflective material so that light is channelled through the surface 42 that runs along the top of the LCD display 25. The diffused light is accordingly channelled into and along the major axis of the light guide to provide substantially uniform lighting for the LCD 25.

In this way light is pumped into the light guide 3 along the major axis from above the LCD 25. The light from the light pipe 39 illuminates the display region 4 and provides lighting for the input region 5. Additional LEDs 67 or other lighting elements may be positioned along the edges of the Perspex™ layer or sheet 37 in the input region 5 to further illuminate the legends 15 for the keys of the array 6.

The LCD 25 itself is bonded to the rear surface of the Perspex™ sheet 37 with an energy absorbing adhesive sheet. Using this technique and ensuring that there are no air gaps between the front of the LCD 25 and the Perspex™ sheet 37, provides a robust solution for mounting the LCD 25. The surface of the LCD 25 that is delicate and generally needs a protective layer distanced from it is protected by the Perspex™ layer 37 adhered to one of its faces. The drivers 44 for the LCD 25 can be seen in FIG. 5.

In the embodiment illustrated the Perspex™ layer 37 includes apertures 48 for locating individual keys and allowing the key shafts 49 to travel to make contact with a printed circuit board 50 located within the casing 2 to register user input. An independently inventive key layout, suitable for use with the general concept discussed will be described in greater detail below. As the key layout is likely to be one of the most enduring elements of the design, it has been designed with future requirements for the casing in mind. The skilled man will be aware that modifications to the key arrangement can be made while still providing the flexibility to accommodate future engine requirements. For example, a joystick, or similar rotational device or multi-directional key could be utilised for input as could other input mechanisms traditionally used on laptop computers.

Figure 4:
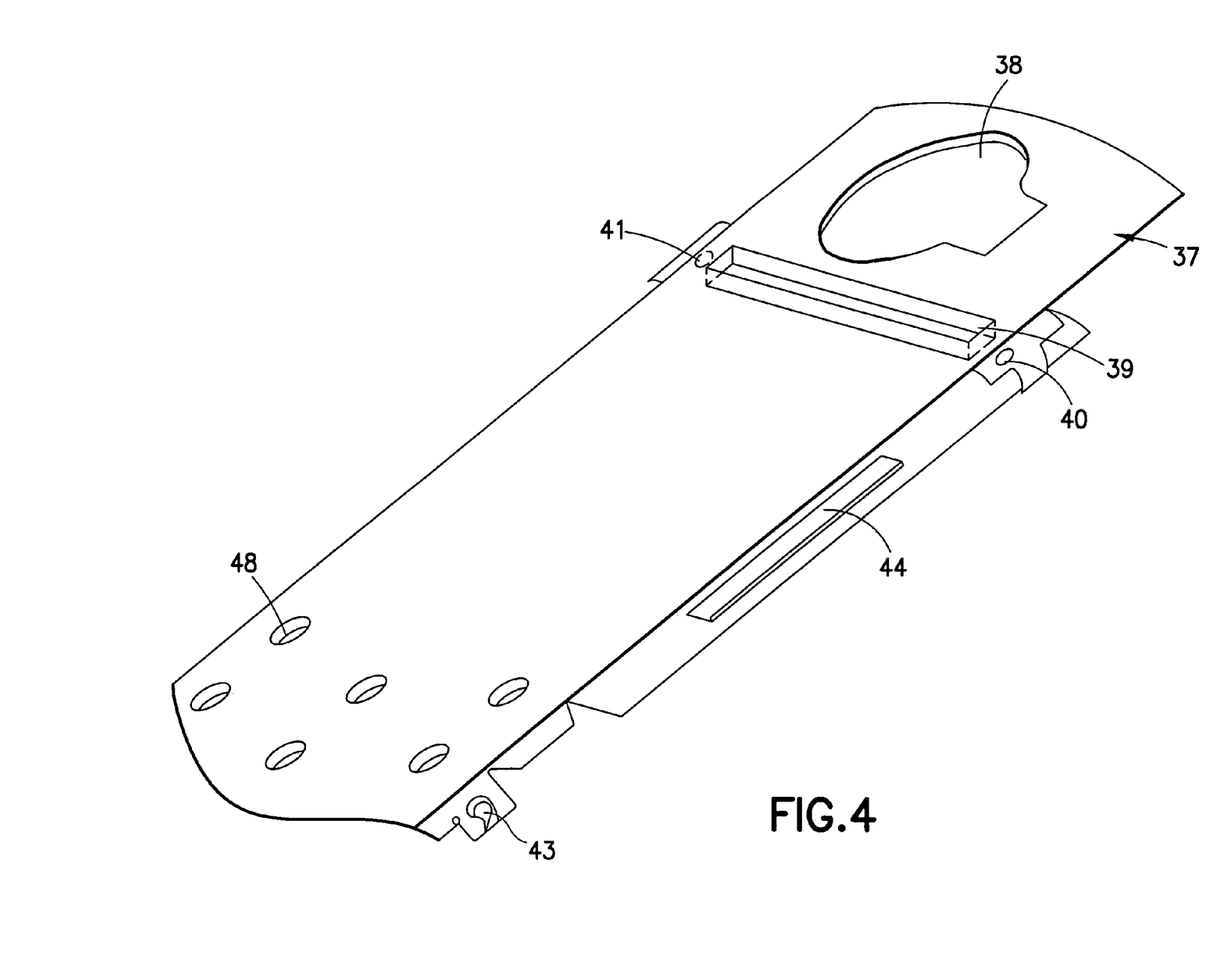
FIG. 4 is a view of one layer of a light guide.
Figure 5:
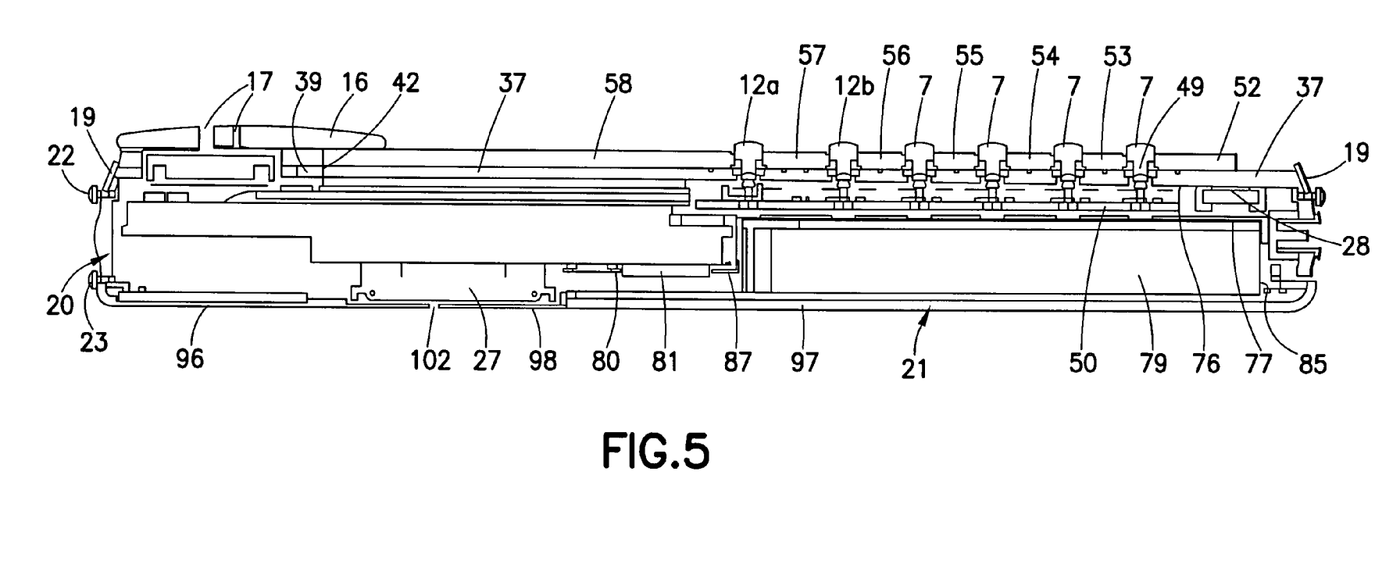
FIG. 5 is a longitudinal section through the communication device.

As can be seen most clearly from FIG. 4, the second layer of the composite light guide 51 may be made in a number of sections 52-58. This is to allow for the choice of brittle materials to be used for the second layer 51. Sapphire has properties including its scratch resistance and optical clarity that make it suitable for use in this context although the material of this element is selectable and a ceramic material could be utilised in this arrangement. Other suitable materials are glass and other minerals and precious and semi precious stones. When a transparent material such as sapphire is used, however, the light guide provides an external surface to the device. Arrangements for the second layer similar to those disclosed in concept in the illustrated embodiment are not necessary when the materials are not brittle. Alternative arrangements will, however, be apparent to the skilled man for accommodating brittle materials in this context.

As mentioned above sapphire is brittle. When considering how to introduce such a material into a casing 2 that is to be long lasting and durable, problems arise. This is particularly the case when the device 1 will inevitably be subjected to knocks and is likely to be dropped many times in its long existence. In the embodiment described, the sapphire is formed in individual sections 52-58. Each of the pieces is adhered to the Perspex™ layer 37 using a UV curing adhesive based on hybrid acrylic technology. Alternatively the sections 52-58 may be adhered to a carrier to absorb any shock. The carrier is then adhered to the substrate 37. In order to increase the durability of the composite light guide 3 and strengthen it against damage, the sections 52-58 are adhered to the more flexible Perspex™ layer 37 leaving gaps 59 extending across the entire width. These gaps 59 act as hinges to allow the composite layer 3 to be relatively flexible along its major axis. In the embodiment illustrated, the layout of the key array 6 has been designed with this in mind. The alpha numeric keys 7 are arranged in groups of three extending across the whole width of the second layer of the composite 51. The function keys or soft key 8, 9 are also arranged in two groups of three. The soft keys 8, 9 and the top scroll key 12*a* follows the line of the alpha numeric keys 7. The call handling keys 10, 11 and the bottom scroll key 12*b* which is displaced from the line of the others defines the lower edge of one of the elements 57 and the upper edge of another of the elements 56. This makes the second row of keys 10, 11, 12*b* distinctive whilst still avoiding problems in manufacture of the elements 52-58.

Although the embodiment described is designed with a brittle material such as sapphire in mind, the resultant arrangement could be formed from any number of other materials including plastics that provide the required optical characteristics. Similarly different key arrangements could be used without departing from individually inventive concepts that are disclosed.

When using a brittle material for a front face light guide 3 problems are also encountered when connecting the front face 3 to the rest of the casing elements. In the illustrated embodiment the edges of the brittle elements 52-58 are protected by the bezel 19 that sits around the whole of the face. The bezel 19, in this embodiment, is formed from a bezel support 60 overlaid with a 0.5 mm thick metal sheet, the bezel cover 61. The metal sheet 61 is bonded to the bezel support 60, that may be formed from plastic, with an adhesive such as a two part epoxy adhesive or a two part acrylic adhesive. As the metal sheet 61 is relatively thin this keeps the weight of the casing 2 down and also allows relatively precious metals such as titanium or gold to be used at relatively lower cost. The bezel 19 could, however, be a single part and/or be formed from a single material for example titanium.

The transparent face 3 in this particular embodiment is securely held in place by a robust mechanism. The Perspex™ layer 37 to which the elements 52-58 are bonded extends beyond the area covered by the elements to provide a lip or edge 62 around the whole of the composite light guide 3. This edge 62 is used to secure the front face 3 in position as it is tucked under the bezel 19 that defines the perimeter of the front face and squeezed between the bezel 19 and the side frame 20.

As can be seen in FIG. 1, the bezel 19 is punctuated with front face protectors 63 whose function will be described in more detail later. These front face protectors 63, in this particular embodiment play a role in holding the casing elements together.

The front face protectors 63 have a tip part 64 that extends over the bezel 19 and a shaft 65-that passes through the bezel 19 and into the plastic side frame 20. The shaft 65 may be tightened onto the frame 20 using a nut 95. In this case the nut stops the front face protectors from falling out of the device. In one embodiment the shafts 65 are screwed into the tips 64 at one end and into the side frame element 20 at the other although other manners of connection could be employed. The shaft 65 and tip 64 could also be one piece rather than two. The bezel 19 and the Perspex™ layer 37 of the transparent face 2 are captured by the front face protector 63 and side frame element 20 as can be seen in FIG. 9*b*. The front face protectors 63 accordingly grip the transparent face 3 securely between the side frame 20 and the bezel 19. The front face protectors 63 are only located next to the key array 6. In order to secure the transparent face 3 around its perimeter additional screws 66 are added to draw the bezel 19 towards the side frame 20 and squeeze the transparent face 3 in place. In one embodiment, the screws 66 thread through the side frame 20 and tap into the bezel support 60. Once the bezel support 60 is secured to the side frame 20 the outer shell 61 of the bezel 19 can be adhered to the support 60 to hide the tapped screw ends 66.

As can be seen in the figures, although the more flexible transparent substrate 37 is overlaid by the bezel 19 secured in position by the front face protectors 63 and other connectors, the sapphire is maintained spaced from the bezel 19 so that it is protected from chipping or other damage as a result of contact. The edges of the sapphire elements do not protrude above the edge of the bezel 19 to provide further protection for the more vulnerable edges. In the arrangement described, the transparent face 3 is gripped in position between the bezel 19 and the side frame 20. The more flexible substrate 37 could, however receive screws or other fasteners to located it relative to the other frame members without damaging the more brittle sapphire layer. The choice of material for the bezel is one open to selection. Precious metals including gold, platinum, silver, steel amongst others would be suitable. The same applies to the material of the front face protectors. Both these elements and others that the skilled man will realise are suitable could be encrusted with precious or semi precious stones such as sapphires, rubies, emeralds and diamonds amongst others. Other crystals or minerals or other materials and veneers could also be utilised.

To reduce the ingress of dirt or fluids a sealant 69 is located between the bezel 19 and the transparent face 3. One way in which this can be introduced is to paint a seal on the underside of the bezel 19 which when dry is compressed between the transparent light guide 3 and the bezel 19 when the bezel 19 and the side frame 20 are pulled together.

Figure 2:
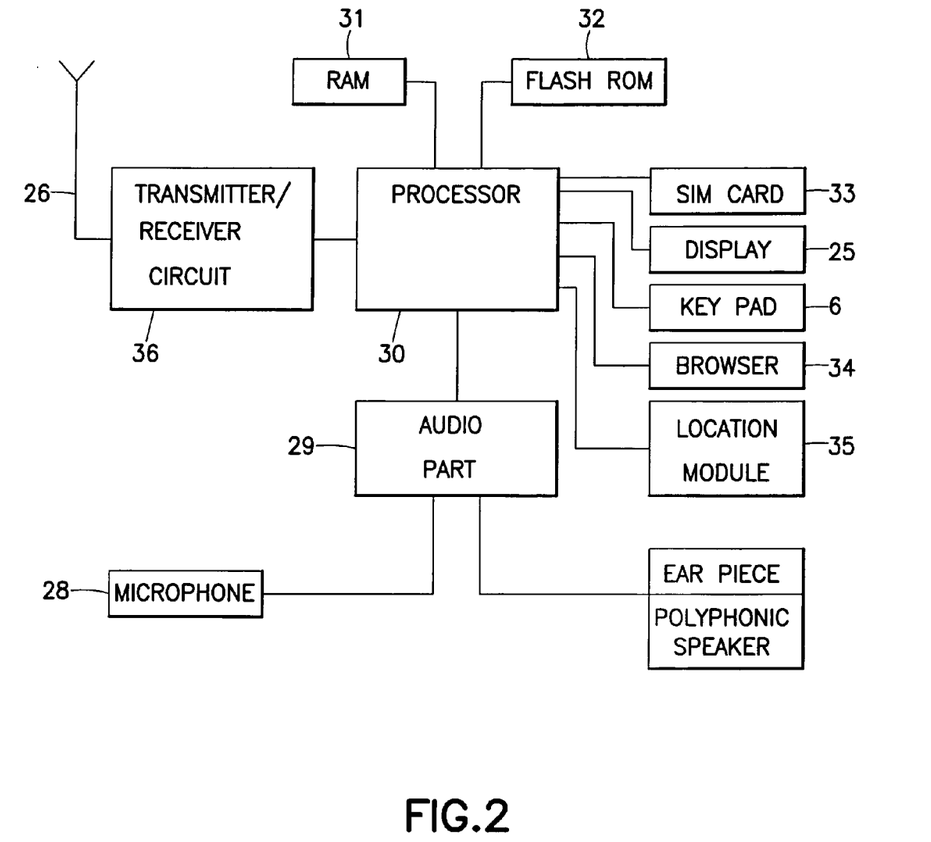
FIG. 2 is a schematic representation of a communication device suitable for embodiments of the present invention.

As can be seen in FIG. 1, 2 or 6, a first rail 22 is located in the interface between the side frame element 20 and the front face 3. The rail 22 hides the discontinuity between the parts from sight and protects vulnerable edges to enhance the durability of the device 1. The rail 22 may be a stamped metal piece 'T' shaped in section extending around the perimeter of the side frame 20. The stem of the 'T' 68 is trapped between the side frame member 20 and the bezel 19 as these two pieces are drawn together on assembly. The stem of the T has apertures 70 that sit over corresponding projections 71 on the side frame 20 member to prevent it from being withdrawn from between the two parts when in position. The top of the T acts as a carrier plate to which an additional extruded piece 72 is soldered or otherwise adhered to provide a seamless finish. The stem could instead be formed from a plastics material.

The side frame member 20 in this particular embodiment is a plastic support 73 with an exterior cover 74. The cover 74 may again be a metal sheet formed, for example, from a precious metal or perhaps a wood veneer or another layer such as leather or other skin. The bonding agent most suitable for adhering the layer to the plastic frame member 73 will differ depending upon the materials that need to be adhered. For metal to plastic a suitable adhesive is a 2 part epoxy resin or 2 part acrylic adhesive. For metal to metal the adhesive would be a reactive polyurethane film or a two part epoxy resin. Similarly the back cover 21 in this embodiment may have a plastic frame and be covered with for example a leather, wood or perhaps metal veneer. With the flexible veneer materials such as leather, it is preferable for the material to be taut on the frame. This is achieved during the veneering process using conventional techniques.

The transparent face 3 provides a seamless transition between the display 4 and the input regions 5. In the display region 4, the LCD 25 is located behind the transparent face 3 and in the input region 5 the key mechanism 75 lies behind it. In one embodiment described, the key mechanism 75 can be seen through the front face 3. However, in other embodiments the inner surface 76 of the Perspex™ substrate 37 may be coated with an opaque material to prevent the inside of the device being seen. Alternative methods of obscuring the inner workings of the device from view such as introducing additional opaque layers or obscuring the view in other ways will be apparent to the skilled man.

For embodiments where, for example, the key operating mechanism 75 can be viewed through the front face 3, it may be desirable to obscure the PCB 50 from view.

The constructed casing 2 provides a housing for the printed circuit board 50 holding the engine components 24, and a battery 79. When the device 1 is a radio telephone, the casing 2 may also provide a SIM card holder 80 to accommodate a SIM card 81. For operation under some radio protocols this will clearly not be necessary.

Returning to the front of the device, located above the display region 4 is the pillow 16 so named because it is designed for the user to rest his or her ear against when making a telephone call. The pillow 16 overlays the ear piece 18 of the device. As described previously there is a cut-out 38 in the Perspex™ substrate 37 of the light guide 3 to accommodate the ear piece 18. The pillow 16, in the illustrated embodiment, is adhered to the Perspex™ substrate 37 covering the ear piece 18. The pillow 16 provides suitable apertures 17 to channel sound to the user. The characteristics of pillow 16 both in terms of the material and surface decoration may be selectable by a commissioning party.

The Perspex™ and sapphire light guide 3 is relatively cold to the touch, the material of the pillow 16 can be chosen to be a material that is inherently warmer to the touch and less prone to marking than a transparent shiny surface. Materials that are thought to be particularly suitable are ceramic or wood and leather veneers. The shape of the pillow 16 obscures part of the LCD 25, providing opposing triangular sections 82, 83 that are used to indicate battery capacity and signal strength respectively.

To complete the structure, the casing 2 has a rear cover 21 and internal compartments 84, 85 suitable for retaining the engine 24, the battery 79 and in this embodiment a SIM card 81. The device illustrated, in common with many other radio telephones, advantageously allows access to the battery compartment 85 as the battery 79 may periodically need replacement. In order for the engine 24 to be protected during this activity, the battery 79 is retained in a compartment providing connectors to the engine 24. Along side the battery compartment 85 in this embodiment is the SIM card holder 80. Under protocols where a SIM card 81 is used to hold subscription information, the user may wish to remove the SIM card 81. For this reason it is convenient for the back cover 21 to be removable to expose both the battery 79 and the SIM card 81. The battery compartment 85 and SIM card holder 80 are provided by an internal casing element 87 that is secured to the side frame 20. This may be formed from plastic or one of many other suitable materials.

In one embodiment the compartments are formed from stamped metal sheet. Titanium and aluminium are two from the numerous suitable materials.

The casing 2 is completed by assembling the back cover 21 to the side frame 20. In the illustrated embodiment, the back cover 21 is formed from three pieces 96, 97, 98. A first piece 96 overlays the antenna location. As the first piece 96 also covers the antenna its dielectric constant is relevant.

In a device of this type where the casing 2 is to survive generations of engines 24, the materials from which is formed are important. They should be hard wearing and durable, retaining their attributes for years longer than is currently required. For this reason ceramics have been considered as an option for the back cover 21 for some embodiments of the invention. Other materials already discussed such as metals or precious metals or veneers would also be possible. With ceramics, however, despite having many desirable characteristics, for locations near an antenna relevant for devices containing such an element, the dielectric constant of the material interferes with the desired transmission pattern.

To provide many of their desirable characteristics without the dielectric constant becoming too high, the rear cover piece 96 can be formed from a material with a lower dielectric constant with a suitable depth of layer deposited on it. This technique and suggested materials could be used for other elements of the casing.

The rear casing element 96 covering the antenna is hooked or chipped to the side frame element 20 and in the process captures the second rail 23 similar in construction to the first rail 22 between the side frame 20 and the back cover 21. Again the rail 23 is provided with apertures 70 that are positioned over corresponding projections 71 on the side frame 20 to more securely hold the rail 23 in position when the back cover 21 is attached.

A second rear casing element 97 covers the battery compartment 85 and the SIM card holder 80. This element is releasably secured to the other casing elements using screws 99 to allow relatively easy access to the SIM card 81 and battery 79. In a preferred embodiment a quarter turn of a screw 100 releases the cover element 97 to allow it to be removed. The same action can disconnect the battery 79 to allow the SIM card 81 to be removed.

The second rear casing element 97 is attached to the side frame 20 in a similar manner to that described in relation to the first rear casing element.

The third element of the rear casing 98 covers the polyphonic speaker 27. This element may be only relatively thin and formed from a precious material such as gold. It will be provided with a suitable aperture 102 to channel sound from the polyphonic speaker 27 that may be used in hands free mode and for providing an audible ring tone. In this embodiment the phone has an aperture in which the polyphonic speaker 27 is located to provide for polyphonic sound. This additional speaker 27 has not been optimised for use in close proximity to the ear as has the speaker 18 located beneath the pillow 16. This allows it to be more effective as a handsfree speaker and enables a greater range of ring tones to be utilised.

In the embodiment described the front 3 and rear casing elements 96, 97, 98 are secured to the side frame 20. A silicon sealant 69 may be extruded around the inside of the back cover 21 to prevent unwanted ingress of dirt and fluid.

The skilled man will realise that the number of parts and the manner in which they are connected can be changed without departing from the several inventive concepts described. For example, in other embodiments the casing may be held together using other techniques and in other ways.

As well as obscuring exposed edges, the rails 22, 23 provide additional elements for customisation as they can be formed from a variety of different materials, in particular different types of precious metal for example gold or platinum as discussed previously in relation to the bezel. The material for the entire 'T' shaped piece or the extruded element could be a precious metal. They also act to protect vulnerable edges of veneered frames from exposure to potentially damaging forces. In doing this unsightly edges are obscured from view. This provides quality and durability in keeping with the overall concept of a retainable casing for a communications device. Regardless of the material of the veneer, this is a convenient arrangement for securing all the elements in place for a durable finish.

In an alternative embodiment illustrated in FIG. 4b, instead of providing rails 22, 23 to protect exposed edges, the adjacent edges themselves are turned inward 105, 106 and held in close proximity. This arrangement also provides the advantage of protection and keeps unsightly discontinuities from view.

A casing with an optically permeable front face provides new opportunities. In a particular embodiment, described with reference to FIGS. 12 and 3 legends 15 associated with the keys of the key array 6 are located on both the front 37a and rear 37b surfaces of the Perspex™ layer 37. With communications devices becoming ever more sophisticated, it is common for each key provided to have a number of different functions. It is useful to be able to label visually the different possible functions associated with a key. For the alpha numeric keys 7 in particular, each key is associated with a single digit and a group of letters or symbols. Ideally these should be displayed clearly.

The skilled man will be aware that the character described above in relation to specific elements of the device can be mixed and matched to suit many distinct design options.

Preferably, the key tips are of a thickness that they protrude from the surface of the second layer 51 of the composite, at least when the keys are in the aforementioned normal state. When the composite is substantially transparent, this will give the impression of floating keys. Furthermore, the key tips should be sufficiently deep to be partially sunk into the second layer of the composite, and preferably have at least two opposing substantially flat sides which correspond with sides of the second layer to prevent lateral rotation of the keys. A gap of the order of 0.1 mm is achieved in the present device between the keys and second layer of the composite: a gap insignificant to the human eye and suitable for assisting in the prevention of lateral rotation of the keys. Lateral rotation is further hindered in the present embodiment, by virtue of the provision of mirrored slanting of the sides of adjacent keys.

In order to ensure the correct relative spacing of elements of the key, the Perspex™ layer 37, PCB 118, and titanium plate 77 are clamped together. In this embodiment, the clamping is provided by the front face protectors 63, and by the provision of additional tapped bosses in projections 68 of the Perspex™ plate and associated fixing means. Consequently, once the keys have been positioned, the Perspex™ layer, PCB and titanium plate can be clamped together using the bosses and fixing means, thereby holding the keys in place and forming a manageable module. This module may then be readily installed in the device using the front face protectors as described above.

The central V shaped key tips of the embodiment illustrated in FIG. 1 enable the user to determine the central vertical axis of the device both by sight and by touch. This is made even easier by the pillow 16 being provided with an apex. Consequently the user can quickly locate a desired central key. The apexes of each central key tip also identify the mid point along the length of the key tip, the point from which the key shaft 49 extends. Hence, they facilitate more accurate depression of the key. This, in turn, may assist in the prevention of contact with neighbouring key tips or the need to place keys further apart to prevent such contact.

Likewise, in this embodiment, the combination of adjacent outer key tips and front face protectors forming a V shape enable the user to determine the position of the vertical axes to one side of which the outer keys lie. Consequently, the user can quickly locate a desired outer key. The key location process is facilitated in this embodiment as the outer key tips extend to the interface between the second layer of the composite 51 and the bezel 19.

The front face of the device illustrated in FIG. 1 is protected by the pillow and front face protectors, 63. The front face 3 is slightly convex, with the highest points lying along its central longitudinal axis. Hence, ordinarily, if placed face down, the device would rest on this axis, resulting in scratches to its surface. Clearly, this is not acceptable, particularly when the second layer of composite is sapphire or the like. The device illustrated in FIG. 1 has been designed to avoid this problem. The pillow 16 and face protector 63a prevent the device resting on the second layer of composite. The pillow 16 protrudes out of the front face of the device, preferably for a distance greater than the distance that at least the keys 6 protrude out of the front face 3. Also, as mentioned above, in the preferred embodiment the key tips protrude slightly from the surface. Hence, the central key tips too may protect the second layer of composite from damage. However, preferably the pillow 16 and chin front face protector 63a are raised sufficiently above the front surface, that the device does not rest on the central key tips either, so as to protect them from damage too.

The device is also designed so that the front face is protected if the edge of the face is knocked. As can be seen from the plan view of the device, depicted in FIG. 21, the bezel front face protectors 63b protrude beyond the surface of the second layer of composite along the interface with the bezel, thereby protecting the second layer of composite from damage in that region. They also reduce the likelihood of damage to the bezel due to knocks. Moreover, they protrude further than the adjacent key tips, hence protecting those key tips from damage too.

One further benefit of the front face protectors 63, particularly the bezel is that they are dimensioned so as to prevent the keys from being accidentally actuated if, for example, the device was placed face down. That is, the top surface of the front face protector tips should either be at the same level or higher than the top surface of a key tip (e.g. as in the relationship between the protectors 63b and the adjacent outer key tips) or, if they are at a lower level than the top surface of a key tip, the distance between the top surface of the protector and key tips must be smaller than the distance the key needs to travel in order for the spring plate contacts to contact the PCB contact region for actuation the key.

Aspects of the invention have been discussed with reference to a radio telephone function. It will be clear to the skilled man that these aspects apply equally to other portable communications devices supporting in addition or as an alternative other functions, such as, amongst others electronic diaries, and electronic notepads.

In the future, although the casing will probably be maintained in substantially the same condition, the engine could be replaced with an engine that perhaps has greater processing power or allows for different functionality, for example improved graphics. To replace the engine will be a relatively simple manner of removing the existing engine and replacing it with a new one. the battery and internal casing walls may be changed at the same time if greater battery volume is then possible.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

The invention claimed is:

1. A device including a casing, a loudspeaker, and a user interface including at least one user input member, wherein the casing comprises an element having a bottom side that is designed to overlie the loudspeaker of the device, the element having apertures for allowing the egress of an audio signal from the loudspeaker, said apertures being designed for placing against a user's ear, wherein a bottom end of the element overlays a top portion of a display region of the device, wherein the bottom end of the element that overlies the top portion of the display is generally V-shaped.

2. A device according to claim 1 wherein the element is formed of a material that is scratch-resistant.

3. A device according to claim 1 wherein the element is fixed to a casing element that is designed to overlie the loudspeaker of the device.

4. A device according to claim 1 wherein the device is a portable communications device.

5. A device according to claim 1 wherein the device is a telephone.

6. A casing according to claim 1 wherein the element is fixed to a casing member that is designed to overlie the loudspeaker of the device, said casing member having apertures corresponding to the apertures in the element.

7. A device including a casing, a loudspeaker, and a user interface including at least one user input member, wherein the casing comprises an element having a bottom side that is designed to overlie the loudspeaker of the device, the element having apertures for allowing the egress of an audio signal from the loudspeaker, said apertures being designed for placing against a user's ear, wherein at least part of the casing is made from a precious material and the element is made from a material that is inherently warmer to the touch than the precious material, wherein a bottom end of the element overlays a top portion of a display region of the device.

8. A device including a casing, a loudspeaker, and a user interface including at least one user input member, wherein the casing comprises an element having a bottom side that is designed to overlie the loudspeaker of the device, the element having apertures for allowing the egress of an audio signal from the loudspeaker, said apertures being designed for placing against a user's ear, wherein the device has a face that includes both the element and the user interface and the element protrudes out of the face to a greater extent than the user interface protrudes out of the face, wherein a bottom end of the element overlays a top portion of a display region of the device.

9. A device including a casing, a loudspeaker, and a user interface including at least one user input member, wherein the casing comprises an element having a bottom side that is designed to overlie the loudspeaker of the device, the element having apertures for allowing the egress of an audio signal from the loudspeaker, said apertures being designed for placing against a user's ear, wherein a bottom end of the element overlays a top portion of a display region of the device, wherein ceramic, leather or wood is used to form the element.

10. A device including a casing, a loudspeaker, and a user interface including at least one user input member, wherein the casing comprises an element having a bottom side that is designed to overlie the loudspeaker of the device, the element having apertures for allowing the egress of an audio signal from the loudspeaker, said apertures being designed for placing against a user's ear, wherein the element is formed of ceramic, wherein a bottom end of the element overlays a top portion of a display region of the device.

11. A casing for a portable communications device, the casing including an element having a bottom side that is designed to overlie the loudspeaker of the device, the element having apertures for allowing the egress of an audio signal from a loudspeaker of the device, said apertures being designed for placing against a user's ear, wherein the element is formed of ceramic, wherein a bottom end of the element is configured to overlay a top portion of a display region of the device.

12. A casing for a portable communications device, the casing including an element having a bottom side that is designed to overlie the loudspeaker of the device, the element having apertures for allowing the egress of an audio signal from a loudspeaker of the device, said apertures being designed for placing against a user's ear wherein the casing has a face that includes both the element and the user interface and the element protrudes out of the face to a greater extent than the user interface protrudes out of the face, wherein a bottom end of the element is configured to overlay a top portion of a display region of the device.

13. A casing for a portable communications device having a loudspeaker and a user interface including a display region, the casing comprising an element having a bottom side that is designed to overlie the loudspeaker of the device, the element having apertures for allowing the egress of an audio signal from the loudspeaker, said apertures being designed for placing against a user's ear, wherein a bottom end of the element overlays a top portion of a display region, wherein the bottom end of the element that overlies the top portion of the display is generally V-shaped.

* * * * *